F. R. JONES.
FRICTION CLUTCH.
APPLICATION FILED JUNE 21, 1909. RENEWED SEPT. 25, 1914.
1,126,780.                                          Patented Feb. 2, 1915.
                                                      2 SHEETS—SHEET 1.
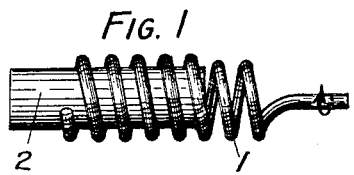
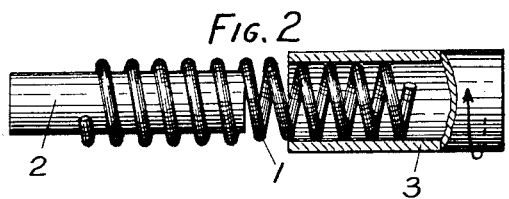
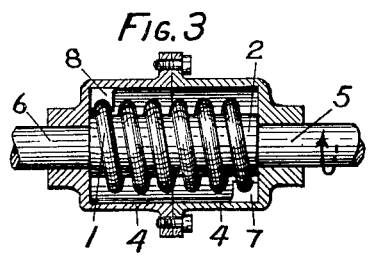
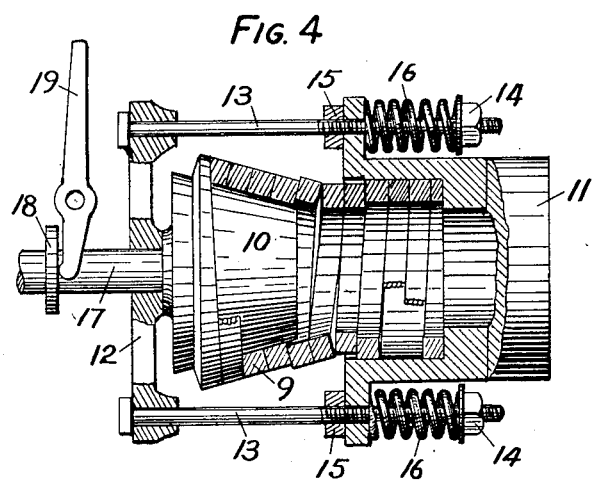
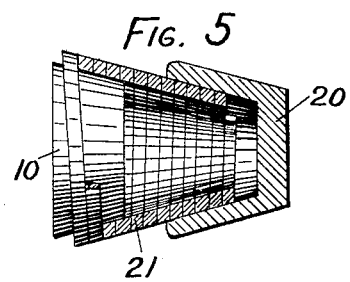
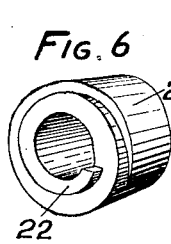
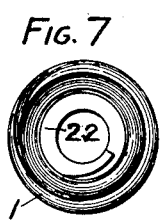
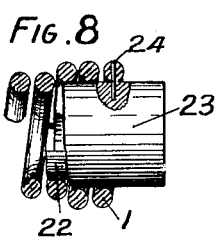
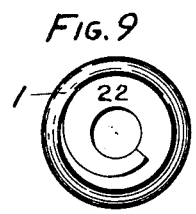
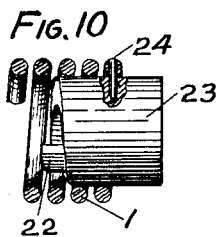
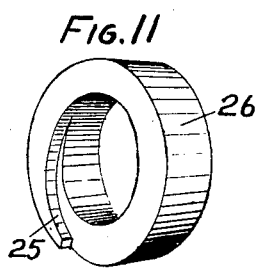
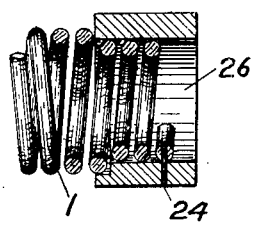
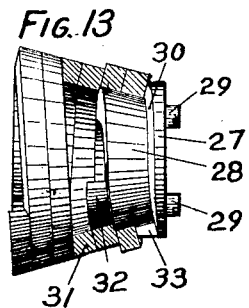
WITNESSES                                           INVENTOR

UNITED STATES PATENT OFFICE.

FORREST R. JONES, OF KNOXVILLE, TENNESSEE.

FRICTION-CLUTCH.

1,126,780.  Specification of Letters Patent.  Patented Feb. 2, 1915.

Application filed June 21, 1909, Serial No. 503,383. Renewed September 25, 1914. Serial No. 863,552.

*To all whom it may concern:*

Be it known that I, FORREST R. JONES, a citizen of the United States, residing at 1702 Melrose place, in the city of Knoxville, county of Knox, and State of Tennessee, have invented new and useful Improvements in Friction-Clutches, of which the following is a specification.

My invention relates to friction clutches and similar torque-transmitting frictional devices, and especially to those in which elastic springs are used to limit the turning effort, or torque, that the clutch will transmit.

The object of my invention is to provide a clutch with a friction member which is elastic, and means of applying the torque to this elastic friction member in such a manner that its pressure against another friction member with which it engages is reduced by action of the transmitted torque. I accomplish this by means of an elastic friction member which has the general form of a coil spring, used in connection with a suitable method of applying either the turning force or the transmitted torque to the elastic friction member.

Figure 14:
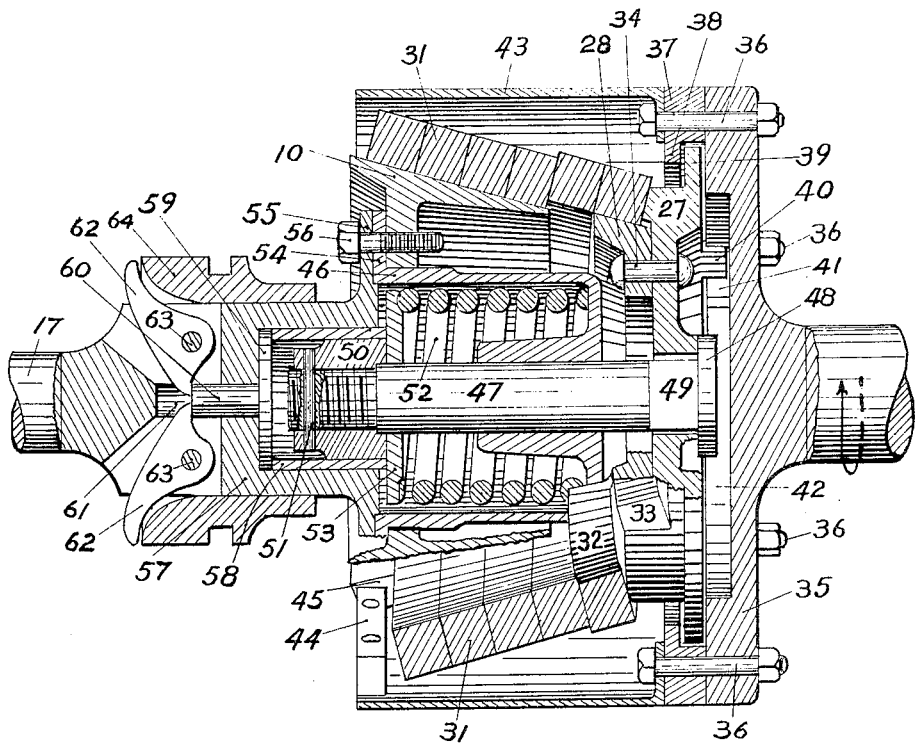
Figure 15:
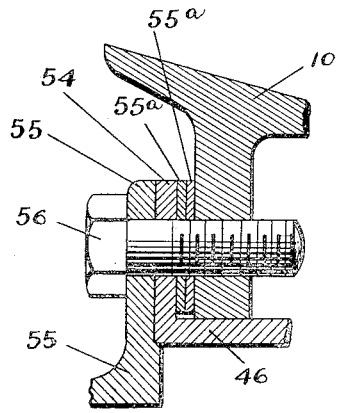

In the accompanying drawings: Figures 1, 2 and 3 represent cylindrical friction members in engagement. These figures are used only as aids in the description of the operation of applicant's devices. Fig. 4 is a complete clutch with releasing mechanism and means of adjusting to a predetermined maximum torque to be transmitted. The clutch is shown in section. The elastic friction member is coiled partly cylindrical and partly conical, and the two friction members with which it engages are shaped correspondingly. Fig. 5 shows three friction elements of the clutch, all of which have conical friction surfaces. Fig. 6 is a perspective view of a concentric spring-mount for holding one end of an elastic coil-spring friction member. Figs. 7 and 8 are end and side views, respectively of a concentric spring-mount with the spring in place on the mount. Figs. 9 and 10 are end and side views, respectively, of the same parts as shown in Figs. 7 and 8, but with the turns of the spring that are not on the mount larger in diameter than in Figs. 7 and 8. Fig. 11 is a perspective view of a concentric spring-mount in which the spring can be mounted internally. Fig. 12 is a longitudinal section of the spring-mount shown in Fig. 11, with the coil-spring in place in the mount. Fig. 13 is a side view of a concentric mount for a conically coiled spring with the spring in place on the mount. The spring is shown partly in longitudinal section. Fig. 14 shows, in the upper half, a longitudinal section, and in the lower half a part longitudinal section and part side view with portions of some of the members broken away in order to expose the interior construction, of a complete clutch with a concentric spring-mount, releasing mechanism and means of adjustment to a predetermined maximum torque to be transmitted. Fig. 15 is a detail of Fig. 14 and shows the means for adjusting so that the transmitted torque will be automatically limited to a desired maximum amount.

Similar reference numbers refer to similar parts throughout the several figures.

In Fig. 1, a coil spring, 1, is forced partly over the end of a cylinder, 2. A short length of the bar from which the spring is made is left straight and extends toward the right from the free end of the spring in a position co-axial with the axis of the free turns of the coil. Before forcing the spring over the cylinder, all the turns of the coil were of the same diameter in the unstressed state, this unstressed diameter being equal to that of the free turns at the right-hand end of the coil as shown in the figure. The expanded turns of the spring grip the cylinder, 2, by their elastic action. When torque is applied to the straight extension of the spring so as to rotate it in the direction indicated by the arrow (clockwise when looking toward the end of the straight extension) and unwind the coil, then the free turns of the coil will be expanded by the applied torque so as to increase the diameter of the free part of the coil. This increasing of the diameter of the free turns continues as the amount of torque is increased until the diameter of the free turns becomes approximately that of the turns on the cylinder. An equal opposing torque must of course be applied to the cylinder, 2. The torque also tends to increase the diameter of the first turn on the cylinder next to the free turns. The pressure of this turn against the cylinder, and therefore its grip on the cylinder, are consequently reduced. With a sufficient number of coil turns on the cylinder, the pressure and grip of this first turn on the cylinder can be reduced almost to zero by the application of torque as described. When this condition of reduced pressure exists, the torque is then nearly all transmitted to the next turn on the cylinder and acts to reduce the pressure of this turn as before. And so on through the successive turns of the coil till the total pressure and grip of all the turns are reduced to such a value that the coil slips around on the cylinder. The pressure of the end turn at the left is always greater than that of the other turns while the spring is slipping around on the cylinder. The amount of torque required to produce this slipping is that which expands the free turns of the coil to a definite diameter that is slightly less than the diameter of the coils on the cylinder. The torque that causes slipping of the spring is practically the same in amount whether the coefficient of friction between the spring and cylinder is high or low in value. When the coefficient of friction is high, the pressure between the friction surfaces must be reduced to a smaller amount than when this coefficient is low, but the greater reduction of pressure is obtained by an almost inappreciable increase of torque and of consequent expansion of the free turns of the coil. The torque that can be transmitted is therefore limited to the definite maximum amount required to expand the free turns of the spring to a diameter which is practically the same as that of the turns on the cylinder, and this maximum torque is practically independent of the value, or of variation in the value, of the coefficient of friction between the friction surfaces.

In Fig. 2, one end of a coil spring, 1, is shown forced over a cylinder, 2, and the opposite end of the spring is forced into a tube, 3. A portion of the spring is left free between the parts 2 and 3. When torque is applied to the tube, 3, to rotate it in the direction indicated by the arrow, the portion of the spring inside the tube is forced out against the tube by the action of the torque in addition to that due to the elastic property of the spring. The combined elastic and torque action cause the spring to bear against the tube so as to prevent its rotation in the tube. In other words, the frictional engagement between the spring and the tube is increased by the application of torque tending to unwind the spring. The action between the cylinder, 2, and the portion of the spring expanded over it is the same as already described in connection with Fig. 1. If torque is applied to the tube, 3, in the direction opposite that indicated by the arrow, so as to tend to wind up the spring, then the spring will be drawn harder against the cylinder, 2, on account of the action of the torque. When the torque thus applied becomes great enough to reduce the diameter of the free portion of the spring to nearly that of the compressed portion in the tube, the pressure against the tube will be reduced so as to allow the spring to slip around in the tube. With a sufficient number of turns of the spring in the tube, this slipping will occur with practically the same amount of torque whether the coefficient of friction between the engaging friction surfaces of the spring and tube is high or low in value. The device shown in Fig. 2 is therefore torque-limiting for either direction of rotation of the tube, 3, which may be considered as the driving member. The same action occurs if the cylinder, 2, is used as the driving member.

In Fig. 3, the clutch consists of a coiled friction spring, 1, on a cylinder, 2, which is larger in diameter than the inside diameter of the spring before it is placed on the cylinder, and a casing made of two similar halves, 4 and 4, which is mounted on journal bearing extensions, 5 and 6, of the cylinder. The two halves of the casing are rigidly fastened together with screws, and are provided with lugs, 7 and 8, one of which abuts against the adjacent end of the spring-bar when torque is transmitted through the clutch. The action is as follows: When torque is applied to the casing, 4, to rotate the casing in the direction indicated by the arrow, the lug 7 presses against the adjacent end of the spring-bar and thus transmits the turning force to the spring, and the spring transmits to the cylinder, 2, the torque corresponding to the turning force exerted against the end of the spring-bar. The transmitted torque tends to unwind the spring and reduces the pressure of the spring against the cylinder, 2. By increasing the amount of the applied torque, the pressure and frictional engagement between the spring and cylinder are reduced so that the spring slips around on the cylinder. With a proper number of turns in the spring this slipping always occurs with practically the same amount of torque whether the coefficient of friction between the spring and cylinder is high or low. If torque is applied to the casing, 4, so as to rotate it in the direction opposite that indicated by the arrow, the lug 8 is then brought against the end of the spring-bar that is adjacent to that lug, and the lug 7 moves slightly away from the spring-bar end adjacent to 7. The action of the spring is then similar to that just described. The clutch limits the torque to the same maximum value for both directions of rotation of the driving member. Either the casing, 4, or the cylinder, 2, can be used as the driving member.

In Fig. 4, the friction spring, 9, has a form partly conical and partly cylindrical.

It engages frictionally with the external conical surface of a friction member, 10, and also with the cylindrical internal surface of the friction member, 11. The end of the cylindrical portion of the coil is flattened to abut against a shoulder in the tubular member, 11. The three members, 9, 10 and 11, are forced against each other by means of a yoke, 12, which is connected to the member 11 by the two bolts, 13, each threaded at one end to receive the nuts 14 and 15. Between each end nut, 14, and a flange on 11, is a compression coil spring, 16, whose expansive force induces tension in the bolt and acts to draw the friction members, 9, 10 and 11, into engagement with each other. The nuts, 14, are adjustable on their bolts and are set so that the friction members are forced into an engagement greater than necessary to transmit the required maximum torque, and the nut, 15, on each bolt is adjusted to strike the flange on 11 so as to prevent the cone from being drawn toward each other more than is desired. The yoke, 12, is free to rotate on the shaft, 17, upon which the cone, 10, is rigidly mounted. This shaft has a flange, 18, and a lever, 19, is provided, which, when its lower end is pressed against the collar, 18, with sufficient force, draws the cone, 10, toward the left and out of engagement with the friction spring, 9. This lateral movement of the cone, 10, is accompanied by a corresponding movement of the yoke, 12, and the bolts, 13, and also by additional compression of the springs, 16. The lever, 19, can be operated either manually, mechanically, or otherwise. The action of the friction spring, 9, in limiting the torque is the same as in the device shown in Fig. 2.

Fig. 5 shows three conical friction members in engagement, the intermediate one being a coil-spring made from a bar which is neither square or rectangular in cross-section. This figure does not show any stop, or stops, for limiting the movement of the friction members relative to each other in a direction to increase the pressure between them. The three parts shown, therefore, do not comprise a torque-limiting device.

For some purposes it is preferable to provide a spring-mount to which the friction spring is pinned or otherwise attached so as to prevent slipping of the spring relative to the mount. By the use of such a spring-mount, properly formed, the free turns of the friction spring can be kept co-axial with the turns on the spring-mount, both when the free turns are stressed by torque and unstressed. In the devices shown in Figs. 1 and 2, the free turns of the spring are not concentric with the turns on the cylinder or in the tube when the free turns are not transmitting torque or are not otherwise stressed. In Fig. 1, the dividing point between the free turns of the spring and the expanded, or stressed, turns is at the bottom of the cylinder, and the bottoms of all the turns of the spring, both free and expanded, are at the same level when the free turns are not stressed. But the tops of the free turns lie lower than the tops of the expanded turns by an amount equal to the difference between the diameter of the unstressed free turns and that of the expanded turns when no torque is applied.

One spring-mount of the form to keep the free unstressed turns of the spring concentric with the turns on the mount is shown in Fig. 6. This form of mount is applicable to a cylindrically coiled spring which fits over the outside of the mount. The means of keeping the free turns of the spring concentric with the turns on the mount, is a scroll-shaped end, 22, on the mount, of which 23 is the cylindrical portion. The scroll has the general shape of a spiral helix.

Fig. 7 shows the end view of the spring, 1, in place on a spring-mount such as shown in Fig. 6, and Fig. 8 is a side view of the spring-mount with the spring on it. The spring is shown in longitudinal section in the latter figure. The pin, 24, prevents the spring from slipping on the mount. The spring is expanded over the mount in Figs. 7 and 8, and the free turns are unstressed. A portion of the spring, intermediate the turns on the cylinder and the free turns, is wound on and presses against the convex surface of the scroll. The scroll holds the free turns of the spring concentric with the expanded turns on the mount. When torque is applied to the spring in the direction tending to unwind it, the free turns always remain concentric with those on the cylindrical portion of the mount as they are expanded by the torque until their diameter becomes equal to that of the turns on the mount, as shown in Figs. 9 and 10. On the other hand, if Figs. 9 and 10 are taken to represent the condition of a spring whose unstressed internal diameter is equal to the external diameter of the cylindrical portion of the mount, then when torque is applied to wind up the spring and reduce the diameter of the free turns, the latter turns will take the position shown in Figs. 7 and 8.

An external concentric spring-mount for a cylindrically-coiled spring is shown in Fig. 11. The surface of the scroll, 25, is of the same form as in Figs. 6 to 10 inclusive, but is concave instead of convex as in the latter figures. The cylindrical portion, 26, of the mount is tubular.

Fig. 12 shows a spring in place in the external mount and held from slipping in the mount by means of the pin, 24.

The conical spring-mount, Fig. 13, is composed of two members, 27 and 28, rigidly fastened together by screws, 29. The portion of the surface, 30, of the member 27, has the shape of a conical helix to conform with the end of the friction spring, 31. The scroll, 32, is a part of the member 28, and supports the portion of the friction-spring, 31, that is intermediate the free turns of the spring and the portion of the spring that is expanded over the conical surface of the mount. This scroll maintains the spring so that the internal and external conical surfaces formed by the free turns of the spring are kept concentric with the axis of the conical member, 28, during the application of torque to unwind the spring. The spring is placed on the mount so that one end of the spring-bar is against the abutment, 33. This abutment prevents the spring from slipping around on the mount when torque is applied so as to tend to unwind the spring.

In Fig. 14, the conically coiled friction spring, 31, shown in longitudinal section, is held by a concentric conical mount composed of the members 27 and 28, rigidly fastened together by rivets, 34, one of which is shown. The scroll, 32, terminates a short distance above where the number, 32, is written on the drawing. The shaded part just above the abutment, 33, is part of the external conical surface of the member 28. The driving member, 35, of the clutch has rigidly attached to it by bolts, 36, a ring, 37, whose internal flange, 38, extends over an external flange, 39, on the spring-mount member, 27, so as to allow only rotative motion of the spring-mount, 27—28, relative to the driving member, 35. A projection, or lug, 40, extends from 27 into a notch, 41, in the circular wall of a counterbore, 42, in the face of the driving member, 35. The notch, 41, is long enough circumferentially to allow the spring-mount, 27—28, to rotate through part of a revolution relative to the driving member, 35, but a complete revolution of the spring-mount relative to the driving member is prevented by the striking of the lug, 40, against one or the other of the end walls of the notch, 41. A tubular shell, 43, is also fastened rigidly to the driving member, 35, by means of an internal flange on the shell, 43, and the same bolts, 36, that hold the ring, 37, in place. A stop-block, 44, is fastened to the inside of the tubular shell, 43, near to the end of the tube farthest from the driving member, 35. This stop-block, 44, bears lightly against the end, 45, of the friction-spring bar so as to keep the lug, 40, pressed against one end of the notch, 41, in the driving member, 35, whenever the friction cone, 10, is not in engagement with the friction spring, 31. The friction cone, 10, is mounted on a tubular bearing member, 46, which is bored concentrically to fit on the short shaft, 47, whose center line coincides with the axis of rotation of the clutch. A head, 48, is provided at the right-hand end of the shaft, 47, and a portion, 49, of the shaft adjacent to the head is squared to fit into a corresponding square hole in the member, 27. The object of squaring the shaft is to prevent its rotation in the member 27. The left-hand end of the shaft, 47, is threaded to receive a nut, 50, which is fastened in place by a radial pin, 51. A compressed expansion spring, 52, presses at one end against the tubular bearing member, 46, and at the opposite end against a thrust washer, 53, which fits loosely on the shaft, 47, and by means of which the expansive force of the spring, 52, is transmitted to the nut, 50, and thence through the shaft, 47, to the member 27 of the friction-spring mount. The expansive force of the spring, 52, acting against the tubular bearing member, 46, is transmitted to the friction cone, 10, by means of the flange, 54, on 46. The expansion of the spring, 52, therefore forces the friction cone, 10, and the friction spring, 31, into engagement with each other. The friction cone, 10, and the tubular bearing member, 46, are both rigidly bolted to the flanged end, 55, of the driven shaft, 17, by means of bolts, 56, one of which is shown.

The enlarged end, 57, of the driven shaft, 17, is bored to receive a bushing, 58, which fits loosely in the bore and also fits loosely over the cylindrical nut, 50. In order to withdraw the friction cone, 10, from engagement with the friction spring, 31, the parts 59, 60, 62, 63 and 64 are provided. The disk, 59, fits loosely in the bore of the enlarged end, 57, of the driven shaft, 17, and the cylindrical plunger, 60, fits loosely in a hole, 61, extended toward the left from the larger bore in which the bushing, 58, fits. The larger and smaller bores are coaxial. The two levers, 62, fit into an opening cut through the enlarged end of the shaft, 17, and each of these levers is connected to the shaft by means of a pin, 63. The sliding sleeve, 64, when pressed toward the left against the longer arms of the levers, 62, causes the shorter arms of the levers to press against the end of the plunger, 60, through which the pressure is transmitted to the disk, 59, and thence through the bushing, 58, to the thrust washer, 53. When the sleeve, 64, is moved toward the left so as to force the longer arms of the levers, 62, in toward each other, the driven shaft, 17, the friction cone, 10, and all the parts rigidly attached thereto are drawn toward the left so as to disengage the friction cone from the friction spring, 31.

The action of the friction spring and its mount are as follows. still referring to Fig. 14: When the driving member, 35, is rotating in the direction indicated by the arrow on the shaft-like extension from the clutch toward the right, and the friction cone, 10, is brought into engagement with the friction spring, 31, the latter is expanded in diameter by the combined action of the transmitted torque and the pressure between the friction cone and the friction spring. The lug, 40, remains as shown in contact with the upper end of the notch, 41, but the expansion and unwinding of the friction spring draws the free end, 45, of the spring-bar away from the stop-block, 44. The friction cone enters into the friction spring until the bushing, 58, presses against both the thrust washer, 53, and the disk, 59, while the latter is in contact with the bottom of the bore in which it fits. The clutch then slips without further increase of transmitted torque. If, instead of rotating in the direction indicated by the arrow, the driving head, 35, is rotating in the opposite direction, and the clutch is then brought into frictional engagement as before, then the stop-block, 44, presses against the free end, 45, of the spring-bar and thus drives the friction spring, 31. As the friction spring unwinds, the spring-mount, 27—28, is in consequence rotated slightly relative to the driving member, 35, so that the lug, 40, is moved away from contact with the end of the notch, 41, during the transmission of torque through the clutch. The clutch can be adjusted for the required amount of maximum torque by means of washers 55ª (see Fig. 15) or other forms of thin material inserted between the flange, 54, and the internal flange on the friction cone, 10.

In all of the forms of clutches described herein, torque can be transmitted from what has been called the driven member to what has been designated as the driving member or driving shaft, as well as in the direction of transmission that has generally been set forth, and in all cases except that of Fig. 1, the driver can rotate in either direction.

Either of the clutches, Figs. 4 and 14, can be used in a vertical position as well as horizontally. Fig. 4 may be conveniently so used by resting the member 12 on a support. The rods 13 may be either fitted tightly in 12, or their heads may rest on the support. In such usage the weight of the shaft (and parts attached to the shaft, if any) acts in unison with the closure springs 16, Fig. 4, to force the friction members into engagement with each other. The expansive force of the closure springs 16 can therefore be made less than that necessary when the clutch is used in a horizontal position, by an amount equal to the weight of the said parts above the clutch. The closure springs can be adjusted to this lesser expansive force by means of the adjusting nuts 14, Fig. 4. Such an adjustment is desirable when using the clutch in a vertical position, in order to keep the force required to disengage the friction members down to a low value. The disengaging means can be applied to the upper shaft in the usual manner. If the weight of the upper shaft and the attached parts is as great, when the clutch is used vertically, as the expansive force exerted by the closure springs when the clutch is used horizontally, then, when the clutch is used vertically, the adjusting nuts 14 can be turned back so that the closure springs 16 are allowed to expand to their full extent and therefore exert no force to press the friction members into engagement with each other.

When Fig. 14 is used in a vertical position, a weaker closure spring 52 can be used than is required than when the clutch is used horizontally. The expansive force exerted by the weaker spring for the vertical position can be less, as compared with the expansive force for a horizontal position, by an amount equal to the weight of the shaft (and attached parts, if any) above the clutch. If the weight of these superimposed parts is as great as the expansive force exerted by the closure spring 52 when the clutch is used horizontally, then the closure spring need not exert any expansive force for the vertical position of the clutch. The disengaging mechanism can be used in the same manner when the axis of the clutch is in a vertical position as when the clutch axis is horizontal.

When a spring is used to force the friction members into engagement, it is preferable to have the spring strong enough to produce a pressure between the friction members which is greater, when no torque is transmitted, than that necessary to transmit the maximum torque to which the clutch automatically limits itself. The same is true whatever means of forcing the friction members into engagement is used. The reason for this is that the pressure between the friction surfaces must be greater, in order to transmit a predetermined torque, when the friction surfaces are copiously lubricated than when they are dry, and it is impossible to predetermine how low the coefficient of friction may become with copious lubrication. The preferable method is, therefore, as just stated, to apply a closing force in excess of that actually necessary for the lowest coefficient of friction, thus making certain that the clutch will not slip at a lower torque than the maximum to be transmitted.

I am aware that friction clutches comprising coil-spring friction members have been made, but I am not aware that any clutch having a coil-spring friction member has been made to automatically limit the torque, independently of variation in the coefficient of friction, for both directions of rotation of the driving member, or that any torque limiting clutch with a coil-spring friction member and means for disengaging the friction members, has been made.

I claim:

1. The combination with the friction members of a clutch, one of which friction members is a coil-spring, and means for engaging and disengaging the friction members, of a mount for said coil-spring, and means to positively limit the movement of the friction members relative to each other in a direction to increase the pressure between the friction members.

2. In a friction clutch, the combination of a driving member, a driven friction member, a coiled spring friction member upon which the transmitted torque acts to positively reduce the pressure between said friction members, a mounting for said coiled spring friction member, means for engaging said friction members to a pressure greater than necessary for transmitting a predetermined amount of torque, and means, acting independent of the torque, for disengaging said friction members, substantially as described.

3. The combination with the friction members of a cone clutch, one of which friction members is a coil-spring, of a mount for said coil-spring friction member, means for engaging the friction members to a pressure greater, when no torque is transmitted, than necessary to transmit a predetermined amount of torque, and means to positively limit the axial movement of the friction members relative to each other in a direction to increase the pressure between them, said combination being such that the application of said predetermined torque to the clutch positively decreases the pressure between the friction members and causes them to slip over each other rotatively while transmitting said predetermined torque.

4. In a friction clutch, the combination of automatic means operated by the torque transmitted through the clutch, for limiting the said transmitted torque to a chosen maximum value, with means under the direct and immediate control of the operator during the operation of the clutch, for causing the said automatic means to automatically limit the said transmitted torque to any value between zero and the said chosen maximum value, substantially as described.

5. In a friction clutch, the combination of automatic means operated by the torque transmitted through the clutch, for limiting the said transmitted torque to a chosen maximum value, with adjustable means to permanently set said automatic means so as to prevent the transmitted torque from exceeding said chosen maximum value, and with means under the direct and immediate control of the operator during the operation of the clutch, for causing said automatic means to automatically limit the said transmitted torque to any value between zero and said chosen maximum, substantially as described.

6. The combination with the friction members of a cone clutch, one of which members is a coil-spring, and means for engaging and disengaging the friction members, of means to positively limit the axial movement of the friction members relative to each other in a direction to increase the pressure between them, so that said pressure is positively and automatically reduced by the application of torque to one of the friction members and the friction members slip rotatively over each other in consequence of said reduction of pressure when the torque reaches a predetermined value.

7. The combination with the friction members of a cone clutch, one of which members is a coil-spring, and means for engaging and disengaging the friction members, of means to positively limit the movement of the friction members relative to each other in a direction to increase the pressure between the friction members.

8. The combination with the friction members of a cone clutch, one of which friction members is a coil-spring, and means to engage and disengage the friction members, of means to prevent the friction members from transmitting torque in excess of a predetermined amount.

9. The combination with the friction members of a clutch, one of which friction members is a coil-spring, of means for engaging and disengaging the friction members, and means to automatically and positively reduce the pressure between the friction members when torque is applied to the clutch, said reduction of pressure being such that the friction members slip over each other rotatively when a predetermined torque is applied.

10. The combination with the friction members of a cone clutch, one of which friction members is a coil-spring, and means to engage the friction members, of means to automatically prevent the friction members from transmitting torque in excess of a predetermined amount.

11. The combination with the friction members of a cone clutch, one of which friction members is a coil-spring, and means for engaging the friction members to a pressure greater, when no torque is transmitted, than necessary to transmit a predetermined amount of torque, of means to positively limit the movement of the friction members relative to each other in a direction to increase the pressure between them, said combination being such that the application of said predetermined torque to the clutch positively decreases the pressure between the friction members and causes them to slip over each other rotatively while transmitting said predetermined torque.

12. The combination with the friction members of a cone clutch, one of which friction members is a coil-spring, of means to adjust the clutch to transmit torque up to a predetermined amount and to automatically and positively limit itself to said predetermined amount.

13. The combination with the friction members of a cone clutch, one of which friction members is a coil-spring, of means to automatically and positively reduce the pressure between the friction members when torque is applied to one of the friction members of the clutch and transmitted to the other friction member, said automatic reduction of pressure being such as to allow the friction members to slip over each other rotatively when the torque reaches a predetermined value.

14. The combination with the friction members of a cone clutch, one of which friction members is a coil-spring, of a mount for said coil-spring, and means to automatically and positively maintain the friction members in fixed positions with regard to axial movement relative to each other, said positions being such as to engage the friction members to a pressure greater while no torque is transmitted than the pressure at which the friction members slip rotatively over each other while transmitting a predetermined torque that is the maximum to which the clutch is adjusted to slip automatically.

15. The combination with the friction members of a cone clutch, one of which friction members is a coil-spring, of means to maintain the friction members in fixed positions with regard to axial movement relative to each other, said positions being such as to engage the friction members to a pressure greater, when no torque is transmitted, than that at which they slip over each other while transmitting the maximum amount of torque that can be applied to the clutch.

16. The combination with the friction members of a cone clutch, one of which friction members is a coil-spring, of means to permanently retain said friction members engaged in fixed positions with regard to axial movement relative to each other.

17. The combination with the friction members of a cone clutch, one of which friction members is a coil-spring, of means for automatically and permanently maintaining the friction members in fixed axial positions relative to each other such that the pressure between the friction members when no torque is transmitted is greater than necessary to transmit the maximum torque to which the clutch automatically limits itself.

18. The combination with the friction members of a cone clutch, one of which friction members is a coil-spring, and means to cause the engagement of said friction members, of means to adjust the clutch to automatically and positively limit the transmitted torque to a predetermined amount, and means to disengage the friction members.

19. The combination with the friction members of a cone clutch, one of which friction members is a coil-spring, and means to cause the engagement of said friction members, of means to adjust the clutch to automatically and positively limit the transmitted torque to a predetermined amount.

20. In a torque-transmitting mechanism, the combination of a rigid friction member, a cylindrically-coiled friction spring and a mount for said spring, said mount having a scroll-shaped portion of such form as to support the spring so that torque transmitted through frictional engagement of said spring and rigid friction member does not tend to move the axis of the mount laterally relative to the axis of the rigid friction member.

21. In a torque-transmitting mechanism, the combination of a rigid friction member, a conically-coiled friction spring and a mount for said spring, said mount having a portion whose radius of curvature differs in such a manner from that of the portion of the spring which makes contact with the mount, said difference of curvature radii existing when the spring is unstressed, that the mount supports the spring so that torque transmitted through frictional engagement of the spring and rigid friction member does not tend to move the axis of the mount laterally relative to the axis of the rigid friction member.

22. In a torque-transmitting mechanism, the combination of a rigid friction member, a coiled friction spring and a mount for said spring, said mount having a portion whose radius of curvature differs in such a manner from that of the portion of the spring that makes contact with the mount, said difference of curvature radii existing when the spring is unstressed, that the mount supports the spring so that torque transmitted through frictional engagement of the spring and rigid friction member does not tend to move the axis of the mount laterally relative to the axis of the rigid friction member.

23. A frictional torque-transmitting mechanism comprising conical friction members one of which is a coil-spring, and means to automatically limit the torque that the mechanism will transmit to a predetermined maximum.

24. The combination with the friction members of a cone clutch, one of which friction members is a coil-spring, of means to automatically and positively limit to a predetermined extent the movement of the friction members relative to each other in a direction to increase the pressure between the friction surfaces.

25. A frictional torque-transmitting mechanism comprising conical friction members one of which is a coil-spring, a mount for said coil-spring, and means to automatically limit the torque that the mechanism will transmit to a predetermined amount.

FORREST R. JONES.

Witnesses:
WM. BAXTER LEE,
JAMES MARQUARD, Jr.